US011692896B2

(12) United States Patent
Quattrone

(10) Patent No.: US 11,692,896 B2
(45) Date of Patent: Jul. 4, 2023

(54) METHOD FOR CALCULATING THE AUTONOMY OF A GAS DISTRIBUTION ASSEMBLY

(71) Applicant: L'Air Liquide, Société Anonyme pour l'Etude et l'Exploitation des Procédés Georges Claude, Paris (FR)

(72) Inventor: Michele Quattrone, Jouy en Josas (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 234 days.

(21) Appl. No.: 17/101,103

(22) Filed: Nov. 23, 2020

(65) Prior Publication Data
US 2021/0072107 A1    Mar. 11, 2021

Related U.S. Application Data

(62) Division of application No. 16/091,794, filed as application No. PCT/FR2017/050693 on Mar. 24, 2017, now abandoned.

(30) Foreign Application Priority Data

Apr. 6, 2016  (FR) ...................... 1653029

(51) Int. Cl.
*G06Q 10/0833* (2023.01)
*G01L 19/08* (2006.01)
(Continued)

(52) U.S. Cl.
CPC .......... *G01L 19/086* (2013.01); *F17C 13/025* (2013.01); *F17C 13/026* (2013.01);
(Continued)

(58) Field of Classification Search
CPC . G01L 19/086; G06Q 10/08; F17C 2250/034; F17C 2250/0408;
(Continued)

(56) References Cited

U.S. PATENT DOCUMENTS 3,688,795 A * 9/1972 Taylor .................. F17C 13/021
                                                137/558
5,013,294 A * 5/1991 Baier .................... A61B 1/015
                                                600/560
(Continued)

FOREIGN PATENT DOCUMENTS

EP    2781178 A1 *  9/2014  ............ A47L 11/302
FR    0845729 B1 *  6/1993  ............. G05D 16/10
(Continued)

OTHER PUBLICATIONS

International Search Report and Written Opinion for corresponding PCT/FR2017/050693, dated May 17, 2017.

*Primary Examiner* — Philip P. Dang
(74) *Attorney, Agent, or Firm* — Elwood L. Haynes

(57) ABSTRACT

A method for calculating the autonomy of a gas distribution system assembly including a container containing gas and equipped with at least one gas filling indicator device and a gas flow rate indicator device at the output of the container. The method includes recovering at least one item of identification information on the container and/or the gas used. The method also includes acquiring at least one image to recover a first datum on a value indicated by the gas filling indicator device and a second datum on a value indicated by the flow rate indicator device. The method also includes communicating the at least one acquired image and the at least one recovered item of identification to a computation module configured to deduce therefrom a corresponding value of autonomy of the gas distribution assembly, the
(Continued)

computation module including at least the ability to process images.

1 Claim, 2 Drawing Sheets

(51) Int. Cl.
  F17C 13/04 (2006.01)
  G06Q 10/08 (2023.01)
  F17C 13/02 (2006.01)
  H04Q 9/00 (2006.01)
(52) U.S. Cl.
  CPC ............. *F17C 13/04* (2013.01); *G06Q 10/08* (2013.01); *H04Q 9/00* (2013.01); *F17C 2201/0104* (2013.01); *F17C 2201/032* (2013.01); *F17C 2201/056* (2013.01); *F17C 2201/058* (2013.01); *F17C 2205/0165* (2013.01); *F17C 2205/0308* (2013.01); *F17C 2205/0329* (2013.01); *F17C 2205/0338* (2013.01); *F17C 2205/05* (2013.01); *F17C 2205/058* (2013.01); *F17C 2221/011* (2013.01); *F17C 2221/014* (2013.01); *F17C 2221/017* (2013.01); *F17C 2221/018* (2013.01); *F17C 2221/031* (2013.01); *F17C 2250/034* (2013.01); *F17C 2250/043* (2013.01); *F17C 2250/0408* (2013.01); *F17C 2250/0439* (2013.01); *F17C 2250/0443* (2013.01); *F17C 2250/0473* (2013.01); *F17C 2250/0495* (2013.01); *F17C 2270/02* (2013.01); *F17C 2270/025* (2013.01); *H04Q 2209/40* (2013.01)
(58) Field of Classification Search
  CPC .......... F17C 2250/043; F17C 2221/017; F17C 2221/018; F17C 2205/058; F17C 13/025; F17C 13/026; F17C 13/04; F17C 2250/0439; F17C 2250/0443; F17C 2250/0473; F17C 2201/0104; F17C 2201/032; F17C 2201/056; F17C 2201/058; F17C 2205/0165; F17C 2205/0308; F17C 2205/0329; F17C 2205/0338; F17C 2205/05; F17C 2221/011; F17C 2221/014; F17C 2250/0495; F17C 2270/02; F17C 2270/025; H04Q 9/00; H04Q 2209/40
  See application file for complete search history.

(56) References Cited

U.S. PATENT DOCUMENTS

| | | | | |
|---|---|---|---|---|
| 5,566,713 A * | 10/1996 | Lhomer | ............. | G05D 16/0402 137/614.19 |
| 5,603,360 A * | 2/1997 | Teel | ............. | F17C 9/00 137/267 |
| 5,728,933 A * | 3/1998 | Schultz | ............. | G01L 19/086 73/146.5 |
| 5,984,280 A * | 11/1999 | Okuda | ............. | B29C 44/60 261/DIG. 26 |
| 6,585,882 B1 * | 7/2003 | Su | ............. | C02F 1/461 205/687 |
| 6,672,151 B1 * | 1/2004 | Schultz | ............. | B60C 23/0408 73/146.5 |
| 6,684,648 B2 * | 2/2004 | Faqih | ............. | E03B 3/28 62/93 |
| 7,155,166 B2 * | 12/2006 | Swan | ............. | G06Q 10/087 455/66.1 |
| 7,287,548 B2 * | 10/2007 | Bleys | ............. | F16K 1/304 137/613 |
| 7,749,308 B2 * | 7/2010 | McCully | ............. | B08B 15/00 95/291 |
| 8,020,768 B2 * | 9/2011 | Ramos-Elizondo | ............. | G06Q 10/087 235/487 |
| 8,226,774 B2 * | 7/2012 | Labib | ............. | B08B 9/0326 134/22.12 |
| 8,323,554 B2 * | 12/2012 | Leonard | ............. | H01G 7/02 264/DIG. 48 |
| 8,384,517 B2 * | 2/2013 | Chu | ............. | G06K 17/0022 340/613 |
| 8,416,309 B2 * | 4/2013 | Yoshimaru | ............. | H04N 5/772 348/333.02 |
| 8,517,062 B2 * | 8/2013 | Allidieres | ............. | F17C 5/06 141/4 |
| 8,953,570 B2 * | 2/2015 | Lin | ............. | G06K 17/0022 370/312 |
| 9,062,996 B2 * | 6/2015 | Nakagawa | ............. | G01F 11/284 |
| 9,100,822 B2 * | 8/2015 | Doss | ............. | H04W 12/04 |
| 9,122,255 B2 * | 9/2015 | Wang | ............. | H04L 12/2834 |
| 9,154,742 B2 * | 10/2015 | Ota | ............. | G01S 5/0018 |
| 9,457,343 B2 * | 10/2016 | Park | ............. | B01J 38/06 |
| 9,564,949 B2 * | 2/2017 | Shimohata | ............. | H04B 5/0056 |
| 9,597,602 B2 * | 3/2017 | Shimohata | ............. | G06F 21/62 |
| 9,706,195 B2 * | 7/2017 | Juni | ............. | G02B 30/56 |
| 9,770,804 B2 * | 9/2017 | Byers | ............. | B24B 57/02 |
| 9,914,631 B2 * | 3/2018 | Manwani | ............. | B67D 3/007 |
| 9,924,102 B2 * | 3/2018 | Gervautz | ............. | H04L 67/60 |
| 10,191,707 B2 * | 1/2019 | Tomita | ............. | G06F 3/14 |
| 10,282,521 B2 * | 5/2019 | Hanson | ............. | A61B 5/1113 |
| 10,438,409 B2 * | 10/2019 | Todeschini | ............. | G06F 3/011 |
| 2005/0075899 A1 | 4/2005 | Corcoran et al. | | |
| 2007/0008152 A1 | 1/2007 | Parias | | |
| 2007/0080223 A1 * | 4/2007 | Japuntich | ............. | A61B 50/362 374/E1.004 |
| 2008/0318622 A1 * | 12/2008 | Jen | ............. | H04M 1/72412 455/552.1 |
| 2009/0272443 A1 * | 11/2009 | Lee | ............. | F16K 1/306 220/586 |
| 2009/0324337 A1 * | 12/2009 | Ball | ............. | G01N 33/24 405/128.25 |
| 2010/0126590 A1 * | 5/2010 | Walworth | ............. | B01J 8/20 137/4 |
| 2010/0261430 A1 * | 10/2010 | Parias | ............. | G06Q 10/087 340/5.83 |
| 2010/0294393 A1 * | 11/2010 | Allidieres | ............. | F17C 13/025 141/1 |
| 2012/0080103 A1 * | 4/2012 | Levine | ............. | G01L 19/12 137/557 |
| 2013/0309637 A1 * | 11/2013 | Minvielle | ............. | G09B 19/0092 434/430 |
| 2014/0063180 A1 * | 3/2014 | Sharma | ............. | G08C 19/00 348/36 |
| 2014/0095119 A1 * | 4/2014 | Lee | ............. | G06T 19/00 703/1 |
| 2014/0123854 A1 * | 5/2014 | Leonard | ............. | B03C 3/45 96/99 |
| 2014/0130875 A1 * | 5/2014 | Fowler | ............. | F16K 37/005 137/557 |
| 2014/0182561 A1 * | 7/2014 | Ibizugbe, Jr. | ............. | F02M 21/0227 123/511 |
| 2015/0222783 A1 * | 8/2015 | Choi | ............. | H04N 1/00342 235/375 |
| 2015/0260343 A1 * | 9/2015 | Baune | ............. | F17C 13/003 206/0.6 |
| 2016/0035143 A1 * | 2/2016 | Hansen | ............. | H04N 1/00342 348/157 |
| 2016/0245426 A1 * | 8/2016 | Fowler | ............. | F17C 13/025 |
| 2016/0257554 A1 * | 9/2016 | Manwani | ............. | B65D 23/02 |
| 2016/0292360 A1 * | 10/2016 | Shreiber | ............. | G16H 30/20 |
| 2017/0003189 A1 | 1/2017 | Bernard et al. | | |
| 2017/0114961 A1 * | 4/2017 | Baune | ............. | F17C 13/04 |

(56) References Cited

U.S. PATENT DOCUMENTS

2017/0255820 A1\* 9/2017 Liu .................. G06F 21/60
2018/0242887 A1\* 8/2018 Dong .................. A61B 5/11

FOREIGN PATENT DOCUMENTS

FR          3 019 877          10/2015
WO     WO 2015 136207          9/2015
WO     WO-2017164830 A2 \*  9/2017  ............. A61C 17/02

\* cited by examiner

METHOD FOR CALCULATING THE AUTONOMY OF A GAS DISTRIBUTION ASSEMBLY

CROSS REFERENCE TO RELATED APPLICATIONS

This is a divisional application of U.S. patent application Ser. No. 16/091,794, filed Oct. 5, 2018, which is a 371 of International Application PCT/FR2017/050693 filed Mar. 24, 2017, which claims priority to French Patent Application No. 1653029 filed Apr. 6, 2016, the entire contents of which are incorporated herein by reference.

BACKGROUND

The invention deals with the field of gas distribution and with the gas distribution assemblies, in particular for medical gases. It relates more particularly to the management of the practical information relating to these gas distribution assemblies, and in particular their autonomy for stock management.

Industrial and medical gases are commonly packaged in gas containers, typically gas bottles or carboys, equipped with a valve block, with or without incorporated regulator, namely a simple valve of open/closed type or a valve with incorporated regulator, also called RDI, making it possible to control the flow rate and pressure of the gas delivered.

In order to protect this valve block, it is common practice to arrange, at the neck of the gas bottle and around said valve block, a protective cap forming a protective shell around said valve block.

In the context of a valve with incorporated regulator, it is known practice to add, in particular on the cap, information that is immediately visible to the user and relating to the gas delivered by the bottle (gas type, pressure, flow rate, etc.). For this, it is possible to use in particular a gas filling indicator device, such as a pressure gauge indicating the pressure of the gas, or a flow rate indicator device.

Gas pressure indicator devices are known which consist of needle pressure gauges or of pressure gauges with digital readout, disposed in particular in the bottom part of the valve. On the same gas distribution assembly, it is known practice to dispose a flow rate indicator device, which, for example, takes the form of a rotary wheel whose displacement generates a modification of the gas flow rate at the output of the valve, by presenting, on the face of a marker visible to the user, a numeric value representative of the corresponding flow rate.

The positioning of these devices in the bottom part of the valve, because of technical constraints, in particular because the protective cap surrounds the valve block or RDI, often makes it difficult or not very easy to read the indications given by the device.

Moreover, integrated electronic devices are known which recover data relating to the filling of the bottle and which present them to the user, in order that the latter might be able to avoid gas supply outages, particularly prejudicial in the hospital environment. These integrated electronic devices are costly and a correct management of the gas supply of a hospital environment, that is to say of the stocks of gas distribution assemblies, requires each bottle to be equipped with such integrated electronic devices to be effective.

SUMMARY

The present invention falls within this context and aims to propose a method for managing the stock of gas distribution assemblies that is easy to implement without requiring heavy investments to change all the stock of gas distribution assemblies of a hospital for example.

In this context, the subject of the invention is a method for calculating the autonomy of a gas distribution assembly comprising a container containing gas and equipped with at least one gas filling indicator device, as an example a gas pressure indicator device, and a gas flow rate indicator device at the output of the container, during which the following steps are carried out: a step of recovery of at least one item of identification information on the container and/or the gas used and a step of acquisition of at least one image, via a communicating mobile device, to recover a first datum on a value indicated by the gas filling indicator device and a second datum on a value indicated by the flow rate indicator device. Said at least one acquired image and said at least one recovered item of identification information are communicated to a computation module configured to deduce therefrom a corresponding item of information on the autonomy of said gas distribution assembly, said computation module comprising at least image processing means.

Thus, it is possible to collect an item of information on the autonomy of a gas container when the latter is not accessible to the user, via computation means embedded in the communicating mobile device, or at the very least present on a server linked with the communicating mobile device, and it is possible to capitalize on this item of digital information by transferring it to a module for managing the stock of such gas distribution assemblies.

According to different features of the invention, taken alone or in combination, it will be possible to provide for:

the first datum and the second datum to be recovered simultaneously by the acquisition of a single image;

the computation module and the image processing means to be able to be embedded in the communicating mobile device; the communicating mobile device can in particular be chosen from among smartphones, or even from among tablets.

the processing means to analyze, in the at least one acquired image, a two-dimensional barcode associated with the gas filling indicator device; and/or the image processing means to analyze, in the acquired image, by character recognition, a numeric value borne by a rotary wheel of the flow rate indicator device.

The step of recovery of at least one item of identification information and the step of acquisition of the first and second data can be performed in one and the same step, or else it is possible to envisage the step of recovery of identification information being a preliminary step to the step of acquisition of the first and second data.

In the latter case, the step of recovery of information can comprise a step of pairing of the communicating mobile device and the gas distribution assembly concerned; the pairing step can be performed by the reading, by the communicating mobile device, of a recognition chip, of RFD or NFC type, embedded in the gas container.

As a variant, it will be possible to provide for the recovery of identification information to be done by manual data entry by the user, or by the acquisition of an image, possibly the same as that used to recover the first and second data.

The preliminary pairing step can generate the opening or the downloading on the communicating mobile device of an application for processing parameters associated with the gas distribution assembly, and it can also generate the recovery of an item of information on the positioning of the communicating mobile device.

The user can receive a request to carry out the acquisition of images if additional information is needed after the preliminary pairing step.

The image acquisition can be performed via one or more photographs and/or via a video.

It is also possible to carry out an acquisition of information on the temperature of the gas container.

It is also possible to provide for a step of warning of the user and/or of a control center to be generated when the autonomy value of the gas distribution assembly is below a determined threshold value.

The invention relates also to a method for managing stock of gas distribution assemblies, based on an item of information on the autonomy of at least one of these assemblies, obtained via the computation method as presented above, said autonomy information item being transmitted to a stock management server.

An item of information on the location of these gas distribution assemblies will advantageously be collected in the steps involved in the autonomy calculation, in order to be able to supply said item of location information to a control unit managing the stocks.

The invention relates also to a gas distribution assembly comprising a gas container, a valve block fixed to the container, and a gas flow rate regulation member having a face supporting an item of information relating to the flow rate of the gas, said assembly further comprising a pressure gauge arranged to show an item of information relating to the filling, and in particular to the pressure of the gas contained in the container.

According to an aspect of the invention, the screen of the pressure gauge is disposed in proximity to the face supporting the item of information relating to the gas flow rate borne by the regulation member.

In this context, it is possible to provide for:

the screen of the pressure gauge and the face supporting information relating to the gas flow rate borne by the regulation member to be arranged opposite the container relative to the valve block;

the pressure gauge and the face supporting information relating to the gas flow rate to extend along planes substantially parallel to one another;

a handle to be disposed at the top of the container, covering the valve block, the pressure gauge and the gas flow rate regulation member, said handle incorporating a recognition chip;

the handle to have at its center a zone for receiving a communicating mobile device; the reception zone can extend along a plane substantially parallel to the planes in which the pressure gauge and the face supporting information relating to the gas flow rate extend;

the orientation of the plane in which the pressure gauge extends advantageously to exhibit an angle of 45° relative to the vertical;

the screen of the pressure gauge to comprise a two-dimensional barcode and a filling indicator in the form of a needle;

the gas container to be a gas bottle.

The invention relates also to an application for managing parameters associated with a gas distribution assembly implemented by a communicating mobile device, capable of being launched or downloaded upon the reading of a recognition chip borne by the gas distribution assembly.

This application can in particular determine the information registered on the gas distribution assembly to define whether an item of information on the autonomy of the container is directly usable, and make a request for the acquisition of an image by the user if not, in order to start a computation method as presented above.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
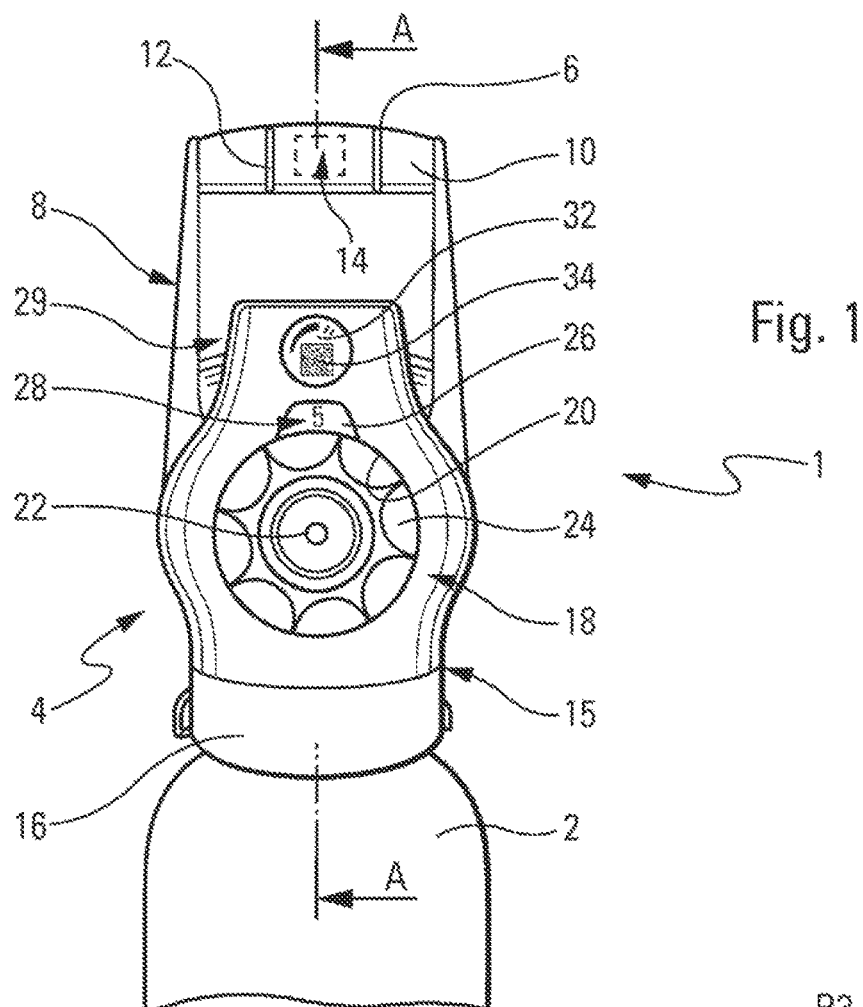
FIG. 1 is a partial front view of a gas distribution assembly, particularly centered on the top part of a gas container and on the associated protective cap.

A gas distribution assembly 1 according to the invention comprises a gas container 2, here a gas bottle, onto a neck of which is fixed, by screwing, a valve block (not visible), namely a valve with or without incorporated regulator. A protective cap 4 is arranged at the top of the gas bottle, covering the valve, in particular to protect it from shocks.

The gas bottle 2 has, by way of nonlimiting example, a cylindrical body made of steel and a size between 10 and 150 cm, and a content of 0.5 to 20 liters (in water equivalent).

The protective cap 4 comprises a capping body forming a protective shell around an internal volume dimensioned to receive the valve block.

Moreover, it is topped by a handle 6 designed to be grasped by a user. The handle 6 is formed from a rigid material, such as a polymer or a metal or metal alloy, and it is linked to the protective cap 4, here by two uprights 8.

The handle is preferably arranged at right angles or almost at right angles relative to the longitudinal axis along which the bottle 2 and the cap 4 mainly extend.

The handle 6 has a slender form, whether rectilinear or incurved, between the two uprights 8, and it has, on a first face 10, a cavity 12, the dimension of which along this slender form is substantially equal to the width of a communicating mobile device 13, so as to form, roughly at the center of the handle, a zone for receiving this communicating mobile device. It is in fact noteworthy that, according to the invention, the bottle can interact with the user via a communicating mobile device such as a smartphone, or even a tablet, touchscreen or not, and do so in different ways, some of which will be presented below.

A recognition chip 14, of NFC (the acronym for Near Field Communication) type or of RFID (the acronym for Radio Frequency Identification) type, is housed in the handle, and for example on the second face, opposite the first face 10, by being advantageously centered over the cavity 12, such that the communicating mobile device can collect information stored in the recognition chip.

The protective cap 4 is produced in a material of polymer and/or metal type, preferentially in plastic material, such as PVC, PE, PET, PP, PMMA, PU, PA etc.

The protective cap 4 has a base 15 for mounting on the top of the bottle, in particular via a fixing ring 16 equipped, if necessary, with a device for attaching the gas distribution assembly to a support, such that a bar of a hospital bed or of a stretcher.

The mounting base 15 is extended, away from the bottle, by an intermediate part 18 comprising an orifice 20 through which a gas output coupling 22 emerges, making it possible to withdraw the gas delivered by the valve. The gas flow rate passing through this coupling is controlled by a gas flow rate regulation member 24, such as a rotary wheel.

Figure 3:
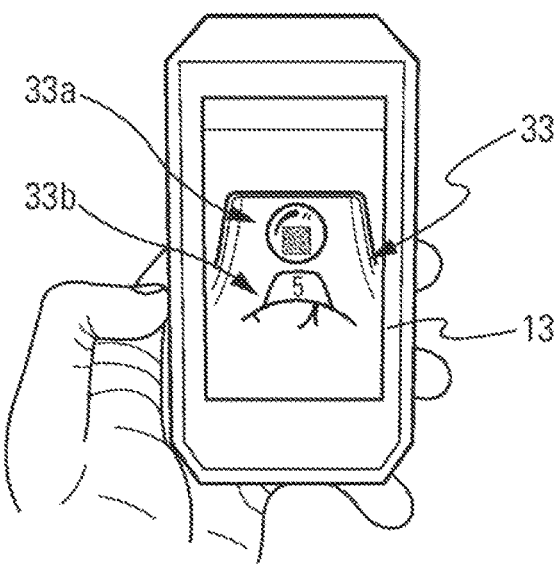
FIG. 3 is a schematic representation of the screen of a communicating mobile device during an image acquisition step of an autonomy computation method according to the invention.
Figure 4:
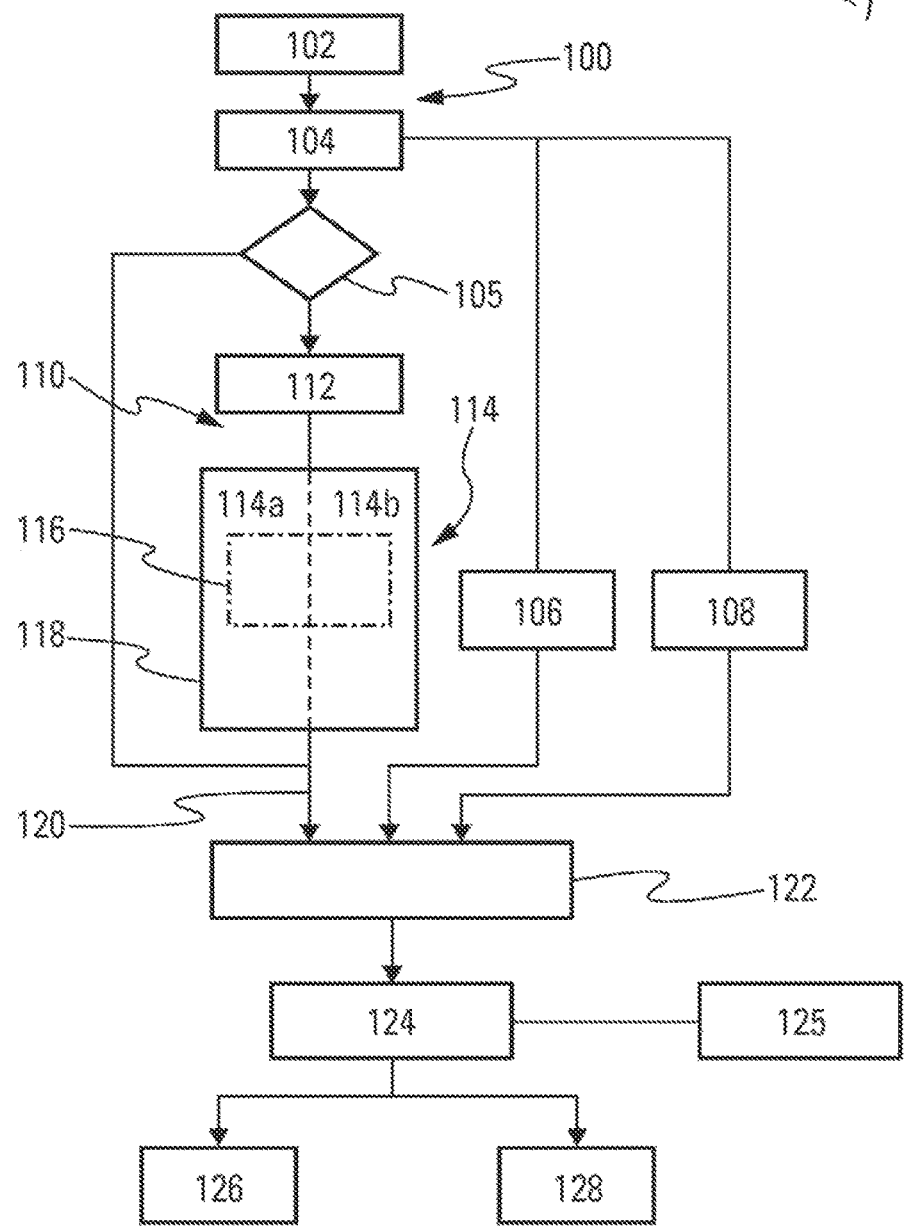
FIG. 4 is a flow diagram illustrating an embodiment of computation of the autonomy method according to the invention, in particular in its application in a method for managing stocks of gas distribution assemblies.

The gas distribution assembly according to the invention is arranged in such a way that the protective cap has, on its front face 25, that is to say the face visible to the user at the same time as the first face 10 of the handle, an opening 26 through which is revealed an information-supporting face 27 of the gas flow rate regulation member on which is represented a value representative of the flow rate 28 (this value here being equal to 5 in FIGS. 1 and 3). The displacement of the regulation member modifies the outgoing gas flow rate and consequently presents, in the opening 26, a value representative of the flow rate. In the case illustrated, the opening 26 is formed by cutting out a part of the edge delimiting the orifice 20, in line with the gas output coupling, in the top part of the protective cap. In other words, the gas output coupling is disposed between the bottle and the gas flow rate indicator device comprising the value representative of the flow rate 28 and the opening 26 through which this value can be seen by the user. In order to facilitate the reading of the value representative of the flow rate by the user, the information-support face 27 extends in an inclined plane relative to a vertical plane at right angles to the axis of the gas output coupling, the inclination being substantially equal to 45°.

The protective cap also has a top part 29 extending the intermediate part 18 moving away from the coupling, away from the mounting base 15 which comprises in particular on its front face 30 a screen of a pressure gauge 32, forming a filling indicator device, in particular an indicator of pressure, for the gas remaining in the bottle.

The screen of the pressure gauge can advantageously comprise a two-dimensional barcode, for example of QR (Quick Response) code type, or a distinctive visual element, this making it possible, as will be described hereinbelow, to identify an item of information on the pressure of the gas remaining in the bottle, in particular by making it possible to detect the orientation of the pressure indicator in the form of a needle.

It would be possible to envisage that this top part has an electronic display screen, not represented here, and for example an LCD screen, configured to display one or more items of information chosen from among the time, the date, the flow rate of gas delivered by the valve, the pressure of the gas in the bottle, the autonomy of the power source powering this screen, the ambient temperature, an alarm, the name of the care establishment, or the like, etc. It is understood that the screen, in order to be able to display such information, would be associated with one or more sensors, such as one or more pressure or flow rate sensors, and with information processing means, for example a microprocessor associated with one or more algorithms, so that the information could, if necessary, be stored in an information storage memory, and finally transmitted, via a suitable connection arrangement, to the electronic screen on which the information can be displayed.

It is noteworthy that at least the front face 30 of the top part of the protective cap, bearing the pressure gauge 32, and the information support face 27 extend in substantially parallel planes and, as was specified previously, inclined relative to a vertical plane by an angle substantially equal to 45°.

As will be understood hereinbelow, such an arrangement makes it possible to acquire in a single image 33, sufficiently clear to be usable thereafter by image processing means, both the information relating to the outgoing gas flow rate and the information relating to the pressure of the gas remaining in the bottle.

In order to use the acquired images, the communicating mobile device comprises a computation module, in which the image processing means make it possible to analyze the acquired images and to transmit the data relating to the flow rate and to the pressure of the gas in the bottle. While it is advantageous for this computation module and the associated image processing means to be embedded in the communicating mobile device, note that they can be present in an external server with which the mobile device is capable of communicating.

Figure 2:
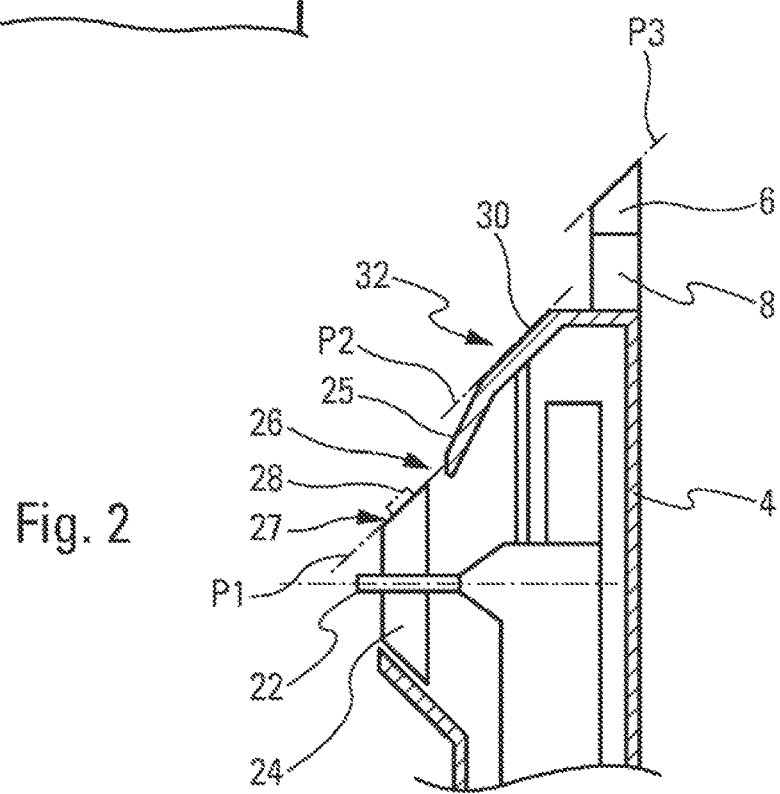
FIG. 2 is a schematic representation of different components of the distribution assembly of FIG. 1, along the cutting plane A-A illustrated in FIG. 1.

In an advantageous embodiment, illustrated in particular in FIG. 2, the zone for receiving the communicating mobile device formed in the handle 6 has a bottom wall which extends along a plane substantially parallel to the planes in which the pressure gauge and the face supporting information relating to the gas flow rate extend. The handle is disposed at the top of the bottle, covering the valve block, the pressure gauge and the gas flow rate regulation member. Thus, it can be possible to acquire in a single image, sufficiently clear to be processed by the computation module, both the information relating to the gas flow rate and pressure and the identification information borne by the recognition chip housed in the handle.

In this advantageous configuration in particular, the screen of the pressure gauge 32 is arranged in the top part 29 of the bottle so that its window is flush with the front face 30, it being understood that the window could, without departing from the context of the invention, be slightly set back from the front face inside the protective cap or, conversely, protrude slightly outward relative to the front face.

It is understood that the arrangement of the indicator devices makes it considerably possible to facilitate for the user the reading of the information delivered by these devices, and more particularly, in the context of the method for calculating the autonomy of the bottle via a communicating mobile device according to the invention, the acquisition of an image 33 comprising these various items of information, while minimizing the number of gestures required of the user for such an acquisition.

Thus, the screen of the pressure gauge forming the pressure indicator device is disposed in proximity to the face supporting information relating to the gas flow rate borne by the regulation member, and they are arranged on substantially parallel planes. Furthermore, the pressure gauge and this support face are arranged on the same side of the gas distribution assembly relative to the gas output coupling, such that the tube fixed onto this coupling does not hamper the acquisition of the information on one and the same image. In other words, the screen of the pressure gauge and the face supporting information relating to the gas flow rate borne by the regulation member are arranged away from the bottle relative to the valve block and the associated coupling.

A gas bottle as has just been described is particularly suited to use in a medical environment. In particular, it is suitable for storing any medical gas or gaseous mixture, in particular of oxygen, air, N2O/O2, He/O2, NO/nitrogen type or the like.

A gas distribution assembly as has just been described in an exemplary embodiment allows the implementation of an autonomy computation method that is particularly useful in particular in stock management, and that can also be useful in an application in hospitals for determining whether this or that gas distribution assembly can be used for this or that patient.

There follows a description of an example of an autonomy computation method according to the invention.

In a first phase 100, the user recovers at least one item of identification information on the bottle 2 and/or the gas by initiating an interaction with the bottle through a reading of the recognition chip 14 via his or her communicating mobile device 13 and a suitable reading device embedded in the mobile device.

The user offers his or her mobile device 13 up to the bottle 2, and more particularly to the zone in which the recognition chip 14 is incorporated, namely the handle 6 of the bottle.

One or more actions can then be triggered.

It is understood that, to start the interactions with the bottle, it is best, initially, to open a dedicated application on the communicating mobile device 13. This can be automatic or, as a variant, be performed manually by the user on an approach of the gas distribution assembly whose autonomy is to be checked.

It is understood that the automatic triggering (step 104) of a dedicated application on the communicating mobile device can either consist in opening the application when the latter is already present on the device, or else in an initial download over the network if it is not present on the mobile device at the time of the reading of the recognition chip (step 102), This can in particular be performed by reading, in the recognition chip, a reference address to be downloaded onto an application downloading platform.

This application advantageously allows the presentation of information that the communicating mobile device is capable of collecting through analysis of the memory of the recognition chip. The user will thus be able to know, via the application, a plurality of items of information that are necessary and/or available concerning the bottle 2, such as the model, its year of distribution, the type of gas used, etc.

The communicating mobile device 13 can also acquire dynamic data originating from sensors associated with the bottle such as values of temperature (step 106), of pressure or of other parameters, by recovery of data already stored in the recognition chip 14 or by recognition of the position of knobs relating to setting means.

The recovery of at least one item of identification information on the bottle and/or one item of identification information on the gas could be done by reading, still using the communicating mobile device 13, a two-dimensional barcode 34 or a distinctive visual pattern of the recognition chip 14 of RFID or NFC type, and the user will receive a request in this regard, that is to say a request for him or her to recover the information by another channel, originating from the communicating mobile device. That could be useful for example when no recognition chip of RDID or NFC type is embedded in the bottle or when that is required by the application to rapidly scan several bottles, particularly in the context of a stock management application.

The scanning of the recognition chip (step 102) can be performed by a wireless link, for example by the use of a radio protocol of Bluetooth type between the communicating mobile device and the electronics of the bottle, and this link allows the exchange of data such as the values of the sensors.

The scanning of the recognition chip (step 102) and the pairing of the communicating mobile device and of the bottle (step 104) can allow for the triggering of a series of sensor usage algorithms to detect the position of the communicating mobile device (step 108). This can in particular be performed by using the internal functions of the communication mobile device, and in particular the geolocation functions, or by using fixed beacons provided in the room in which the gas distribution assembly is disposed, said beacons being able for example to communicate with the mobile device via a wireless communication of Bluetooth type. As an alternative, it will be possible to envisage having to communicate by contact with these beacons, for example by scanning a complementary code such as a two-dimensional QR barcode disposed in proximity to the bottle.

Whatever the variants, this phase of pairing of the communicating mobile device and the bottle allows for the storage in the mobile device of all the relevant data that it has captured.

In a second phase 110, the user must actively participate to collect additional data. In particular, and particularly in the case where the information collected in the first step 100 is insufficient (test step 105), the user is prompted to take one or more images 33, or a video, of the bottle in a step 112 of acquisition of images, via the photographic device or the camera of the communicating mobile device 13.

The image processing means are configured, in an image analysis and processing step 114, to process the images and/or the video acquired by the user via the communicating mobile device. These image processing means can consist of an application present on the mobile device or else of software embedded in a computer remote from the mobile device. In the latter case, the user will be able to transfer the images to be processed via a wired connection between the mobile device and the computer.

The image processing means are configured to deduce, from the acquired images and/or videos, additional information on the bottle, and they can in particular consist in means configured to detect data such as:

the pressure indicated by the needle pressure gauge, by detecting the position of the needle in the space by a reference associated with a two-dimensional barcode, by using, for example, the method described in the document WO2015136207 (step 114a);

the flow rate indicated by the information support face of the flow rate regulator device, by using appropriate optical recognition software, of character recognition type, or an algorithm of correlation with pre-stored reference images (step 114b);

the position of an on/off switch of a flow rate indicator device.

It will be understood that the image analysis and processing steps 114a and 114b are based on a mechanical support detection, but it would be possible, without departing from the context of the invention, to analyze the acquired image to detect the values presented by one or more digital electronic gauges.

It is described here that the step of recovery of identification information, namely the steps of the first phase 100, by reading of the recognition chip in the example illustrated above, is a preliminary step to the step of acquisition of the first and second data relating to the pressure and the flow rate of the gas in the bottle, that is to say the steps of the second phase 110, but it will be understood that the recovery of identification information and the acquisition of the first and second data will be able to be performed simultaneously through one and the same image, this simultaneity being allowed by the specific arrangement of the bottle as presented above.

The data collected automatically or by an action performed by the user can be stored locally in the communicating mobile device of the user, it being understood that they can also be stored on an external server in a remote place in order to supply data for example to a gas or gas distribution assembly supplier, consequently capable of reacting promptly to the needs of the users, and for example hospitals.

The image processing means 116 form part of a computation module 118 configured to deduce from this image an item of autonomy information 120 corresponding to the gas distribution assembly. The analysis of the image 33 makes it possible to determine, on the one hand, a value of pressure of the gas remaining in the bottle, by decryption of the first part of the image 33a acquired containing the information borne by the gas filling indicator device, and on the other hand, a gas flow rate value at the output of the bottle, by decryption of the second part of the image 33b acquired containing the information borne by the gas filling indicator device, and the computation module can, on this basis, calculate the time remaining for the gas distribution in these flow rate conditions. The calculation will advantageously be able to be completed by an item of temperature information obtained by a sensor associated with the bottle or with the room in which the bottle is disposed.

The item of autonomy information determined by the computation module is then displayed on the communicating mobile device, in order to give an indication to the user, and/or it is sent to a stock management module 124 via a communication interface 122, so as, in particular, to allow the implementation of an automatic replenishment 126 of the bottle when the autonomy value is below a determined threshold. It is understood that, in this case, the present invention allows the user to more effectively manage the local stock of gas distribution assemblies.

Such a calculation can also allow an action 128 on the distribution parameters defined for this gas distribution assembly, particularly by prompting the user to modify the value of an actuator such as a flow rate regulator.

There now follows a more detailed description of a possible application of the invention, for a gas distribution assembly 1 in which a bottle 2 is equipped with a recognition chip 14 of NFC type, a first beacon with wireless link, of Bluetooth type, linked to a temperature sensor and therefore capable of returning an item of information on the temperature of the gas contained in the bottle, a needle pressure gauge 32 forming a pressure indicator device, and a flow rate regulation member 24 with rotary adjustment wheel.

A second beacon with wireless link is also provided, independent of the bottles, in each room in which a bottle can be stored, for example in each of the storage rooms of a hospital.

The user disposes his communicating mobile device 13, and by way of example hereinbelow his or her smartphone, in the cavity 12 forming a reception zone in the handle 6 of the gas distribution assembly 1, and the smartphone and the associated applications scan the recognition chip 14 so that a pairing is generated between the smartphone and the bottle. In a first phase 100, a first step of recovery of information on the bottle and/or the gas is performed, and a connection is generated with the first beacon associated with the bottle via a wireless connection of Bluetooth type in order to acquire the temperature of the bottle.

A management application is started up and it configures the smartphone for it to try to discover whether one or more second beacons are in its wireless communication zone. If such second beacons are detected, the smartphone can store a location and an ambient temperature that are specific to the paired bottle. In the absence of any detectable second beacon, the use of the geolocation function of the smartphone can make it possible to acquire the geolocation coordinates of the smartphone.

When the pairing is finished, by reading of the recognition chip, the application sends a request to the user for him or her to orient the camera of the smartphone toward the flow rate and pressure indicator devices, in order to perform a step of acquisition of at least one image of the pressure gauge and of the flow rate regulation member, such that computation means associated with the smartphone can determine a first datum on a value indicated by the gas pressure indicator device and a second datum on a value indicated by the flow rate indicator device.

Particularly desirable is a simultaneous recovery of the first datum and of the second datum by the acquisition of a single image, it being understood that it will be possible, without departing from the context of the invention, to recover the first datum and the second datum by images acquired in succession or by a video.

Advantageously, according to the invention, the planes in which the information supports of the first and second data extend are substantially parallel to one another.

The pressure gauge has, on its screen, in the vicinity of the needle, a two-dimensional barcode, such that by using a method described in the document WO2015136207, the smartphone acquires the identification of the bottle and the pressure value of the gas present in the bottle.

On the same image, the computation module determines, by processing the image with a character recognition reader, the position of the flow rate selector.

As specified previously, and as can be seen in FIG. 2 in particular, the plane P1 in which the information support of the first datum, that is to say the information support face 27, extends and the plane P2 in which the information support of the second datum, that is to say the screen of the pressure gauge 32, extends are substantially parallel to one another and they advantageously extend according to an angular orientation relative to the vertical substantially similar to the angular orientation relative to the vertical of the plane P3 containing the bottom wall of the cavity 12 forming a housing for receiving the smartphone 13. Thus, when the user receives a request to take a photo of the flow rate and pressure indicator devices, following the reading of the recognition chip, the smartphone is already oriented as it should be to allow a clear image to be taken, the user at the very most having to shift the telephone in the same plane to free it from the reception housing.

It is understood that the processing of the image to determine the value relating to the pressure and the processing of the image to determine the value relating to the flow rate are advantageously carried out simultaneously on the basis of the same image, but that it would be possible, without departing from the context of the invention, to successively process two distinct images or a video.

The smartphone stores in its memory the identification information on the bottle, the ambient temperature and/or the temperature of the bottle, the pressure of the gas remaining in the bottle, the position of the flow rate selector, the geolocation of the smartphone and the time at which the scanning was performed.

Using these data, if the bottle is used, the smartphone allows for the accurate calculation of the autonomy of the bottle, and it can set up an alarm to alert the user when a low quantity of gas in the bottle is judged critical, particularly in the case of an application in a hospital, where it is necessary for sufficient air to be present for patients to be treated correctly. The threshold value beyond which an alarm is generated can, if necessary, depend on a parameter identifying the patient 126 to whom the gas will be administered.

The connection with the second wireless beacon can be used for the updating of the autonomy of the bottle in case of a change of ambient temperature of the gases which are sensitive to temperature, for example acetylene.

If the bottle is not currently being used, that is to say that the smartphone has detected that the flow rate selector is in the "zero" or "off" position, the smartphone can simply generate a request to the user to ascertain whether the bottle is intended to be used or to be stored, in order to refine the management of the stocks.

The above description explains clearly how the invention makes it possible to achieve the objectives set for it and in particular to propose a gas distribution assembly that makes it possible, by an appropriate computation method, for the user to recover a datum on the autonomy of this distribution assembly that is easily usable by a server and a stock management module, particularly in the case of the use of such gas distribution assemblies in hospitals.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas distribution assembly comprising a gas container, a valve block fixed to the gas container and comprising at least one gas output coupling, and a gas flow rate regulation member having a face supporting an item of information relating to a flow rate of a gas, the gas distribution assembly further comprising a pressure gauge arranged to show an item of information relating to a pressure of the gas contained in the gas container, wherein a screen of the pressure gauge is disposed in proximity to a face supporting the item of information relating to the gas flow rate borne by the gas flow rate regulation member, further comprising a handle disposed at the top of the gas container, covering the valve block, the pressure gauge and the gas flow rate regulation member, said handle incorporating a recognition chip, wherein the handle has at its center a zone for receiving a communicating mobile device, wherein the pressure gauge and the face supporting the item of information relating to the gas flow rate extend along planes parallel to one another, wherein said reception zone extends along a plane parallel to planes in which the pressure gauge and the face supporting the item of information relating to the gas flow rate extend.

* * * * *